US010776057B2

(12) United States Patent
Park

(10) Patent No.: US 10,776,057 B2
(45) Date of Patent: Sep. 15, 2020

(54) IMAGE FORMING DEVICE AND METHOD FOR TRANSMITTING STATE INFORMATION OF IMAGE FORMING DEVICE

(71) Applicant: HEWLETT-PACKARD DEVELOPMENT COMPANY, L.P., Spring, TX (US)

(72) Inventor: Hyun-wook Park, Suwon-si (KR)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/243,659

(22) Filed: Jan. 9, 2019

(65) Prior Publication Data

US 2019/0146733 A1 May 16, 2019

Related U.S. Application Data

(63) Continuation of application No. PCT/KR2016/014640, filed on Dec. 14, 2016.

(30) Foreign Application Priority Data

Aug. 4, 2016 (KR) .......................... 10-2016-0099625

(51) Int. Cl.
*G06F 3/12* (2006.01)
*G06Q 10/08* (2012.01)
(Continued)

(52) U.S. Cl.
CPC .............. *G06F 3/1229* (2013.01); *G06F 3/12* (2013.01); *G06F 3/1203* (2013.01);
(Continued)

(58) Field of Classification Search
None
See application file for complete search history.

(56) References Cited

U.S. PATENT DOCUMENTS

2003/0197887 A1* 10/2003 Shenoy ................. G06F 3/1285
358/1.15
2006/0161658 A1* 7/2006 Noguchi ............ G03G 15/5079
709/225
(Continued)

FOREIGN PATENT DOCUMENTS

EP 2605607 A1 6/2013
EP 2632193 A2 8/2013
(Continued)

*Primary Examiner* — Henok Shiferaw
(74) *Attorney, Agent, or Firm* — Jefferson IP Law, LLP

(57) ABSTRACT

An image forming apparatus is provided. The image forming apparatus includes an input/output unit, a communicator to communicate with a wireless device, a memory storing a program for transmitting state information of the image forming apparatus, a controller to, by executing the program for transmitting the state information of the image forming apparatus, control the image forming apparatus to receive, from the wireless device, a probe request packet for searching for a peripheral device, generate a probe response packet comprising the state information of the image forming apparatus in response to the probe request packet, and transmit the probe response packet to the wireless device, and an image forming job performer to perform an image forming job under control of the controller.

18 Claims, 9 Drawing Sheets

(51) Int. Cl.
*G06Q 10/06* (2012.01)
*G06Q 10/00* (2012.01)
*G06Q 10/10* (2012.01)

(52) U.S. Cl.
CPC ........... *G06F 3/1292* (2013.01); *G06Q 10/00* (2013.01); *G06Q 10/06* (2013.01); *G06Q 10/08* (2013.01); *G06Q 10/10* (2013.01)

(56) References Cited

U.S. PATENT DOCUMENTS

| | | | |
|---|---|---|---|
| 2008/0261640 A1 | 10/2008 | Yoshida | |
| 2013/0027737 A1* | 1/2013 | Suzuki | G03G 15/5079 358/1.14 |
| 2015/0264514 A1 | 9/2015 | Qi et al. | |
| 2016/0088591 A1* | 3/2016 | Kim | H04W 4/80 370/338 |
| 2016/0306596 A1* | 10/2016 | Yasuda | H04N 1/00204 |
| 2018/0241833 A1* | 8/2018 | Hachiya | G06F 3/1229 |
| 2018/0349835 A1* | 12/2018 | Ishida | G06Q 10/087 |

FOREIGN PATENT DOCUMENTS

| | | |
|---|---|---|
| EP | 3001723 A1 | 3/2016 |
| WO | WO-2014124536 A1 | 8/2014 |

\* cited by examiner

IMAGE FORMING DEVICE AND METHOD FOR TRANSMITTING STATE INFORMATION OF IMAGE FORMING DEVICE

BACKGROUND ART

Network-related technologies have been developed and various functions for data communication through peer-to-peer wireless communication between devices have been utilized. Examples of peer-to-peer wireless communication between devices include Bluetooth, Wi-Fi Direct, long term evolution (LTE) Direct, etc.

According to these technologies, an image forming apparatus may support peer-to-peer wireless communication between devices. The image forming apparatus may provide various pieces of state information of the image forming apparatus to a user through peer-to-peer wireless communication with peripheral devices.

When an image forming apparatus provides state information through peer-to-peer wireless communication with peripheral devices, the image forming apparatus may need to perform a process of searching for and discovering a peripheral device, establishing a wireless connection with the device, receiving a state information request, verifying state information, and transmitting the state information.

BRIEF DESCRIPTION OF DRAWINGS

The above and other aspects, features, and advantages of certain examples of the disclosure will be more apparent from the following description taken in conjunction with the accompanying drawings, in which.

Throughout the drawings, it should be noted that like reference numbers are used to depict the same or similar elements, features, parts, components, and structures.

DETAILED DESCRIPTION

Reference will now be made to examples that are illustrated in the accompanying drawings. In this regard, the examples may have different forms and should not be construed as being limited to the descriptions set forth herein. In order to further clearly describe features of the examples, descriptions of other features that are well known to one of ordinary skill in the art are omitted herein.

In the specification, when an element is "connected" to another element, the elements may not only be "directly connected," but may also be "indirectly (e.g., electrically) connected" via another element therebetween. Also, when a region "includes" an element, the region may further include another element instead of excluding the other element, unless otherwise differently stated.

In the specification, an "image forming job" may denote any one of various jobs (for example, printing, copying, scanning, and faxing) related to an image, such as forming of an image or generating/storing/transmitting of an image file, and a "job" may denote not only an image forming job, but may also denote a series of processes required to perform the image forming job.

Also, an "image forming apparatus" may denote any device capable of performing an image forming job, such as a printer, a copier, a scanner, a fax machine, a multi-function printer (MFP), or a display device.

Also, "print data" may denote data having a format printable by a printer.

Also, a "user" may denote a person who performs manipulation related to an image forming job by using an image forming apparatus or a device connected to the image forming apparatus wirelessly or via wires. Also, a "manager" may denote a person who has authority to access all functions and a system of an image forming apparatus. A "manager" and a "user" may be the same person.

Figure 1:
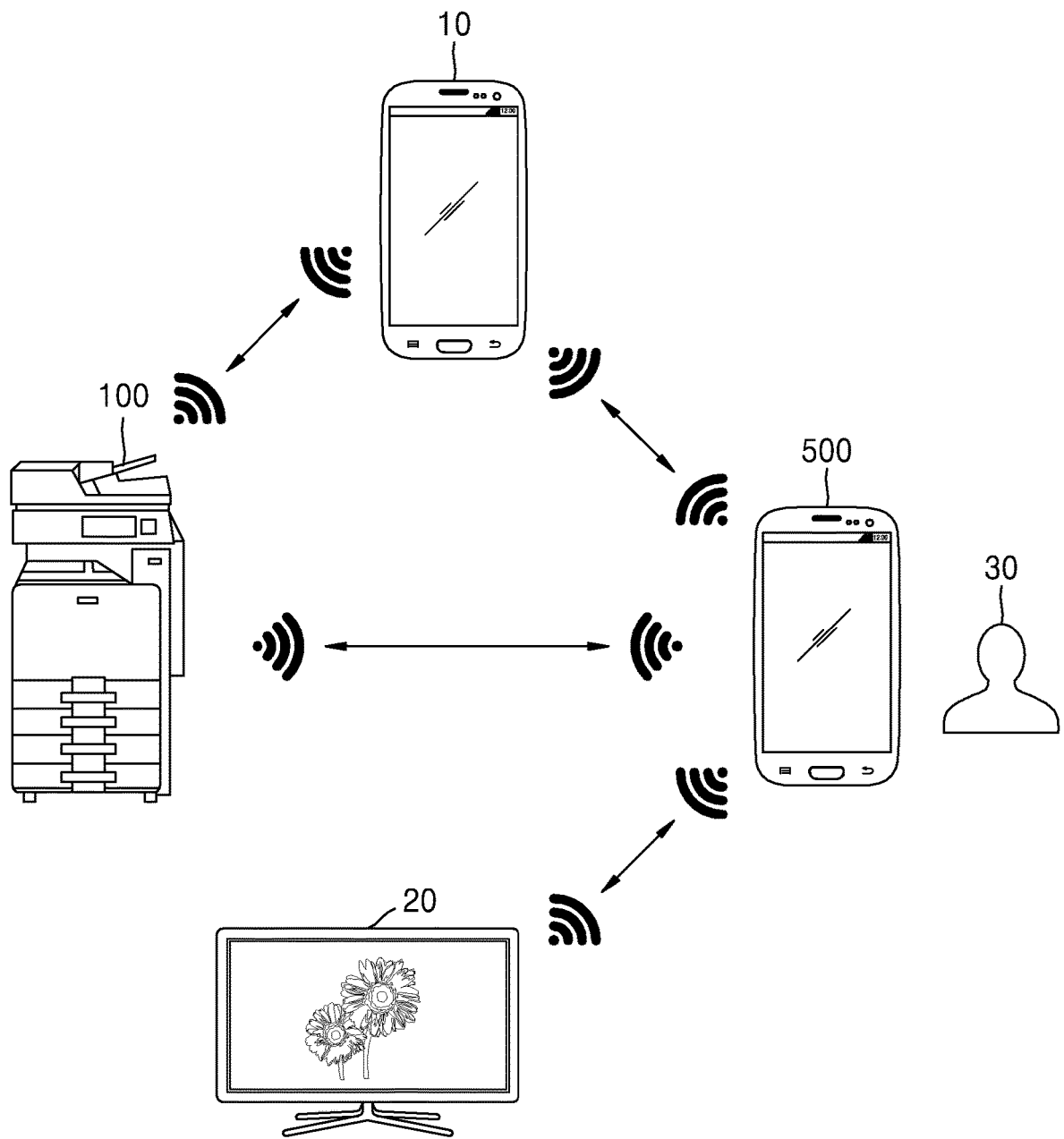
FIG. 1 is a diagram illustrating a system for peer-to-peer wireless communication between devices, according to an example.

FIG. 1 is a diagram illustrating a system for peer-to-peer wireless communication between devices, according to an example.

Referring to FIG. 1, a plurality of wireless devices 10, 20, and 500 may exist around an image forming apparatus 100. Each of the wireless devices 10, 20, and 500 may perform peer-to-peer wireless communication. For example, each of the wireless devices 10, 20, and 500 may perform communication such as Bluetooth, Wi-Fi Direct, long term evolution (LTE) Direct, etc.

According to an example, the image forming apparatus 100 may perform peer-to-peer wireless communication with the wireless device 500 through any one of the wireless devices 10, 20, and 500 to provide a user 30 with state information of the image forming apparatus 100.

In an example, the image forming apparatus 100 may receive a probe request packet from the wireless device 500, generate, in response thereto, a probe response packet including state information of the image forming apparatus 100, and transmit the generated probe response packet to the wireless device 500. In another example, the image forming apparatus 100 may broadcast or multicast a beacon packet including the state information of the image forming apparatus 100 without receiving a signal from an external source.

Figure 2:
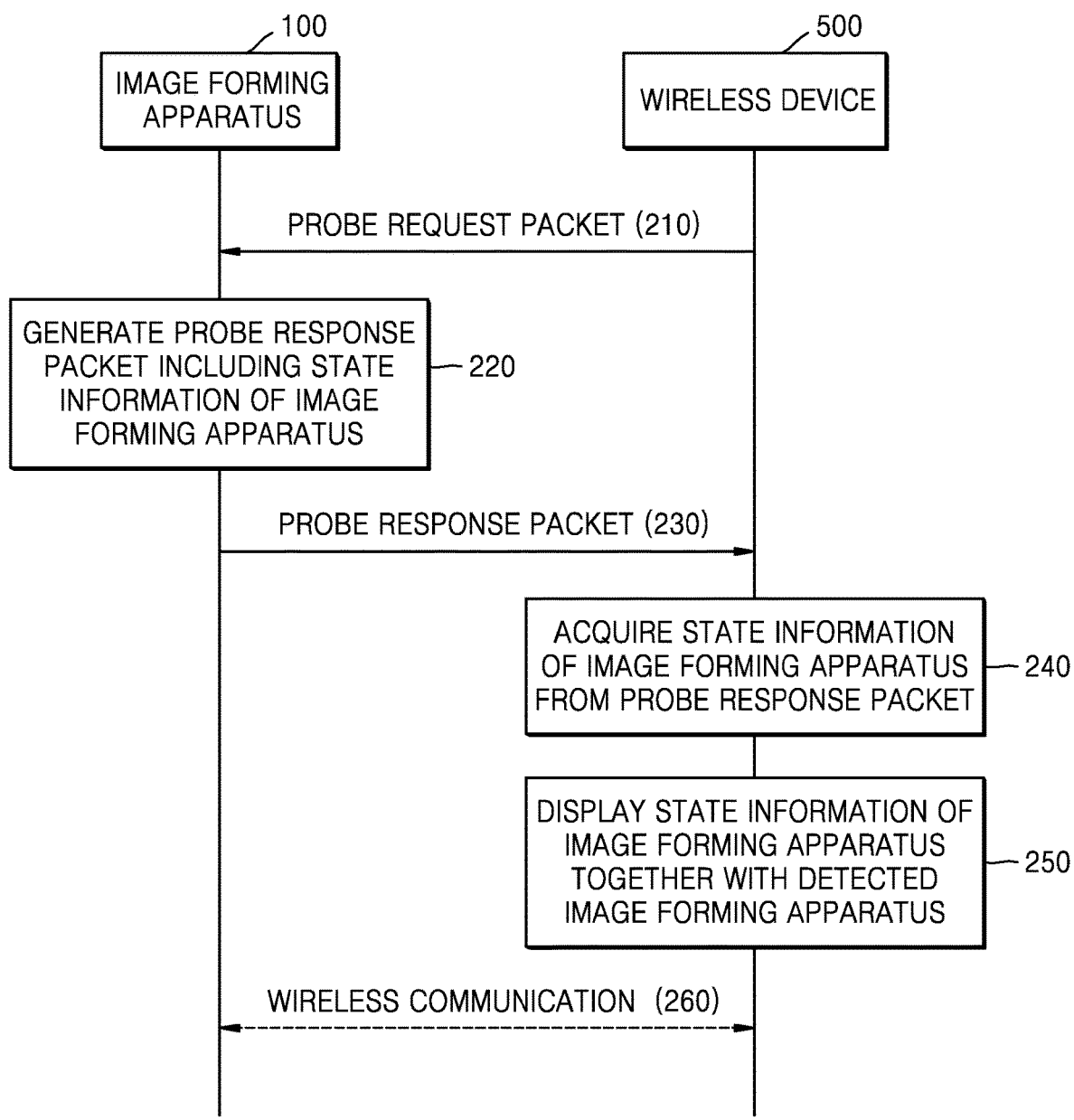
FIG. 2 is a flowchart illustrating a process of transmitting and displaying state information of an image forming apparatus, according to an example.

FIG. 2 is a flowchart illustrating a process of transmitting and displaying state information of an image forming apparatus, according to an example.

FIG. 2 shows an example in which the image forming apparatus 100 receives a probe request packet from the wireless device 500, generates, in response thereto, a probe response packet including state information of the image forming apparatus 100, and transmits the generated probe response packet to the wireless device 500.

Referring to FIG. 2, the wireless device 500 may transmit the probe request packet to probe a peripheral device for peer-to-peer wireless communication, and the image forming apparatus 100 may receive the probe request packet transmitted by the wireless device 500 in operation 210. The probe request packet is a packet for searching for peripheral devices in a peer-to-peer wireless communication process. Therefore, since the other party device may not be specified, the probe request packet may be broadcast to multiple unspecified peripheral devices instead of being transmitted to a specific party device.

In operation 220, the image forming apparatus 100 may generate the probe response packet including the state information of the image forming apparatus 100 in response to the received probe request packet. In operation 230, the image forming apparatus 100 may transmit the generated probe response packet to the wireless device 500. The probe response packet is a packet for informing of the presence of a device that received the probe request packet in response to the probe request packet. The image forming apparatus 100 may transmit the probe response packet to the wireless device 500 since the image forming apparatus 100 may specify the other party device, i.e., the wireless device 500 that transmitted the probe request packet, from the received probe request packet to some extent. In an example, the image forming apparatus 100 may include the state information of the image forming apparatus 100 upon generating the probe response packet, thereby directly providing the state information of the image forming apparatus 100 to the wireless device 500 that transmitted the probe request packet without a separate data transmission process.

The wireless device 500 that received the probe response packet in operation 230 may acquire the state information of the image forming apparatus 100 that transmitted the probe response packet, from the probe response packet in operation 240. In operation 250, the wireless device 500 may display the state information of the image forming apparatus 100 acquired together with the detected image forming apparatus 100.

In operation 260, the image forming apparatus 100 and the wireless device 500 that verified the other party through the probe request packet and the probe response packet may perform wireless communication. Operation 260 may or may not be performed as needed. For example, when the user 30 selects the image forming apparatus 100 to perform an image forming job such as printing or scanning, the user 30 may operate the wireless device 500 to perform wireless communication with the image forming apparatus 100. Conversely, when the user 30 selects the other device 10 or 20, the image forming apparatus 100 and the wireless device 500 may not perform wireless communication.

According to an example, the wireless device 500 may display the state information of the image forming apparatus 100 to the user 30 immediately in the operation of searching for the peripheral device before performing wireless communication, thereby enhancing user convenience.

Figure 3:
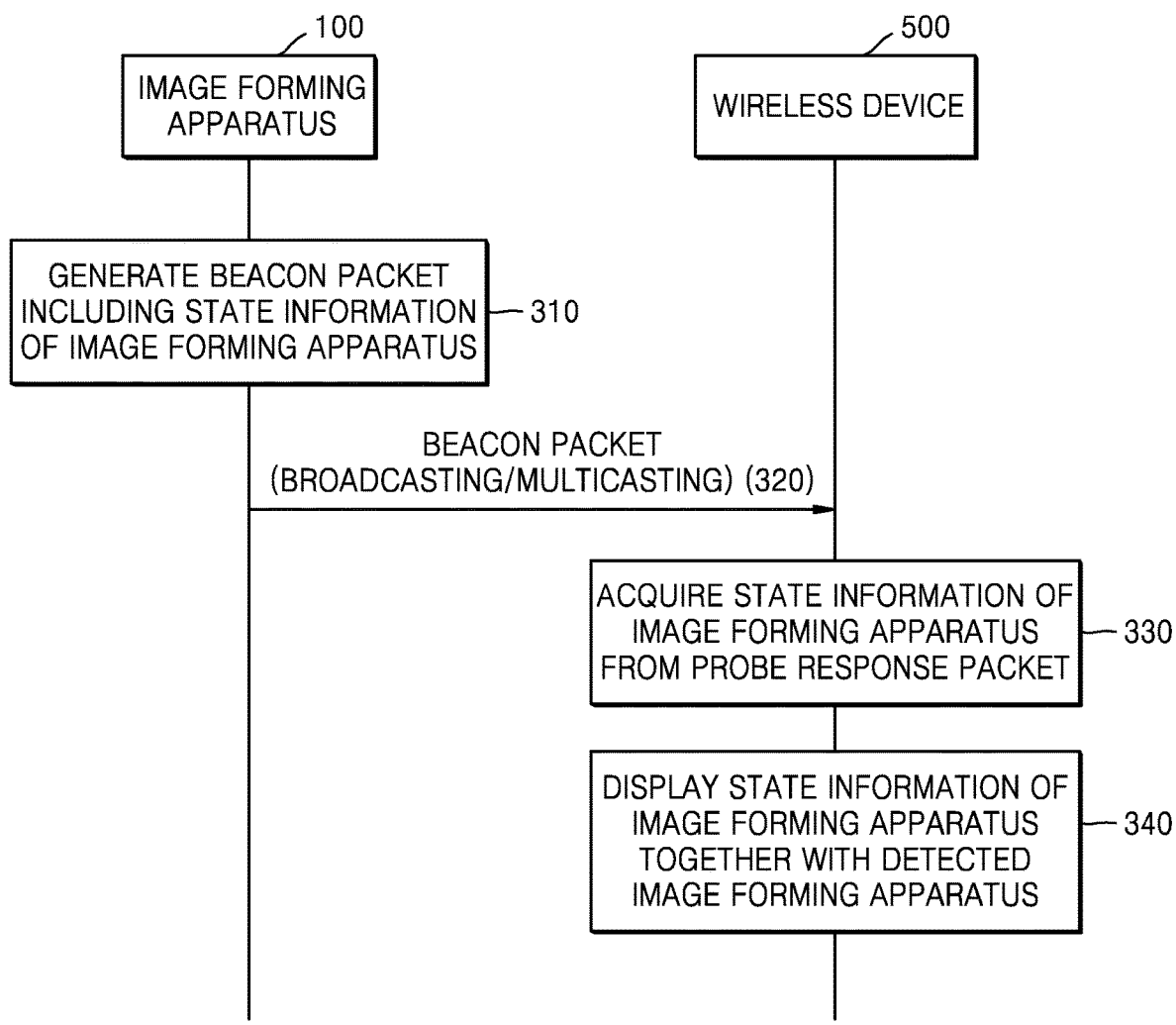
FIG. 3 is a flowchart illustrating a process of transmitting and displaying state information of an image forming apparatus, according to an example.

FIG. 3 is a flowchart illustrating a process of transmitting and displaying state information of an image forming apparatus, according to an example.

FIG. 3 is a diagram illustrating an example in which the image forming apparatus 100 broadcasts or multicasts a beacon packet including the state information of the image forming apparatus 100 even without receiving a signal from an external source.

Referring to FIG. 3, the image forming apparatus 100 may generate a beacon packet including the state information of the image forming apparatus 100 in operation 310. Such a beacon packet may be generated periodically or when a predetermined event occurs, even though the signal is not received from an external source.

In operation 320, the image forming apparatus 100 may transmit the beacon packet by using at least one of broadcasting or multicasting. The beacon packet is a packet for informing of the presence of the image forming apparatus 100 for peer-to-peer wireless communication. Therefore, since the other party device may not be specified, the beacon packet may be broadcast to multiple unspecified peripheral devices instead of being transmitted to a specific party device.

The wireless device 500 that received the beacon packet in operation 320 may acquire the state information of the image forming apparatus 100 that transmitted the beacon packet, from the beacon packet in operation 330. In operation 340, the wireless device 500 may display the state information of the image forming apparatus 100 acquired together with the detected image forming apparatus 100.

According to an example, the wireless device 500 may receive the beacon packet and immediately display the state information of the image forming apparatus 100 to a user before performing wireless communication, thereby enhancing user convenience.

Hereinafter, example configurations of the image forming apparatus 100 and the wireless device 500 will be described.

Figure 4:
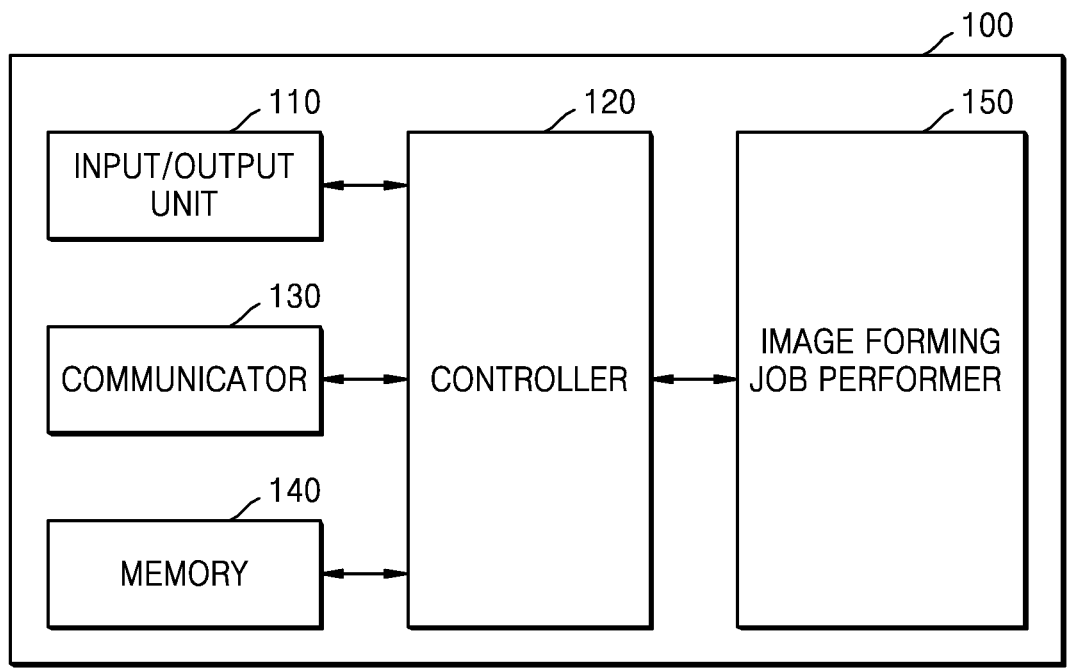
FIG. 4 is a diagram illustrating a configuration of an image forming apparatus, according to an example.

FIG. 4 is a diagram illustrating a configuration of an image forming apparatus, according to an example.

Referring to FIG. 4, the image forming apparatus 100 according to an example may include an input and output unit 110, a controller 120, a communicator 130, a memory 140, and an image forming job performer 150. Also, although not illustrated in FIG. 4, the image forming apparatus 100 may further include a power supply for supplying power to each component of the image forming apparatus 100.

The input and output unit 110 may include an input unit for receiving, from a user, an input for performing an image forming job, and an output unit for displaying information, such as a result of performing an image forming job or a state of the image forming apparatus 100. For example, the input and output unit 110 may include an operation panel for receiving a user input and a display panel for displaying a screen.

In more detail, the input unit may include one or more device for receiving various types of user inputs, such as a keyboard, a physical button, a touch screen, a camera, a microphone, or the like. Also, the output unit may include, for example, a display panel, a speaker, or the like. However, an example is not limited thereto, and the input and output unit 110 may include a device supporting various inputs and outputs.

The controller 120 may control an operation of the image forming apparatus 100, and may include a processor, such as a central processing unit (CPU). The controller 120 may control other components included in the image forming apparatus 100 such that an operation corresponding to a user input received through the input and output unit 110 is performed.

For example, the controller 120 may execute a program stored in the memory 140, read a file stored in the memory 140, or store a new file in the memory 140.

In an example, the controller 120 may execute a program for transmitting state information of the image forming apparatus 100, control the image forming apparatus 100 to receive a probe request packet for searching for a peripheral device from the wireless device 500, generate a probe response packet including the state information of the image forming apparatus 100 in response to the probe request packet, and transmit the probe response packet to the wireless device 500.

In an example, the state information of the image forming apparatus 100 included in the probe response packet may include state information of consumables. For example, the state information of the image forming apparatus 100 may include a remaining amount of toner, a remaining amount of paper, a remaining life of a transfer member, or the like.

Further, in an example, the state information of the image forming apparatus 100 may include purchase information used to purchase a consumable. For example, the purchase information may include a direct uniform resource link (URL) used to purchase the consumable, and may include an identification number of the consumable, such as a parts identification number of the consumable, or an identification number of the image forming apparatus 100. When the purchase information is the URL, the user who received the probe response packet may access the URL to purchase the consumable. Also, when the purchase information is the identification number of the consumable or the identification number of the image forming apparatus 100, the user who received the probe response packet may use the identification number to purchase the consumable.

Also, in an example, the probe response packet may include at least one information element (IE). At this time, the state information of the image forming apparatus 100 may be included in a vendor specific information element assigned to a vendor among the at least one IE.

With regard to the probe response packet according to the institute of electrical and electronics engineers (IEEE) 802.11 international standard as an example, an IE may be represented by a tag in a tagged parameters field included in a wireless local area network (LAN) management frame field of the probe response packet. Each tag may include a tag number (i.e., element ID) indicating an ID of a tag, a length indicating the length of information included in the tag, data, or the like.

The vendor specific information element is an IE for representing information defined by a vendor that is not defined in the standard. The vendor specific information element may have an organizationally unique identifier (OUI) value indicating the vendor.

In an example, the state information of the image forming apparatus 100 is not the information defined in the standard, and thus may be included in the vendor specific information element. For example, when the state information of the image forming apparatus 100 is remaining toner information, the remaining toner information may be represented by CMYK and included in the data.

For example, the remaining toner information may be displayed in a data format such as C99M88Y77K20, which means that 99% of the cyan color toner, 88% of the magenta color toner, 77% of the yellow color toner, and 20% of the black color toner is remaining. However, this is merely an example of displaying the state information of the image forming apparatus 100, and the state information of the image forming apparatus 100 may be displayed by using various other methods.

Also, the purchase information of the toner may be represented by a URL and included in the data. This may be the URL of a website where the toner may be purchased. The user who received the probe response packet may access the URL to purchase a consumable.

In an example, a beacon packet may also be configured in a structure similar to the probe response packet described above. More specifically, in an example, the beacon packet may include at least one IE. At this time, the state information of the image forming apparatus 100 may be included in the vendor specific information element among the at least one IE.

Referring back to FIG. 4, in an example, the controller 120 may acquire the state information of the image forming apparatus 100, generate an IE including the state information of the image forming apparatus 100, and include the IE in the probe response packet. More specifically, the controller 120 may generate the consumable information and the vendor specific information element including the purchase information of the consumable and include the consumable information and the vendor specific information element including the purchase information of the consumable in the probe response packet.

Also, when the state information of the image forming apparatus 100 is updated, the controller 120 may delete an existing IE including the state information of the existing image forming apparatus 100, generate an IE including the updated state information, and include the IE in the probe response packet.

The communicator 130 may communicate with another device or a network in a wired or wireless manner. Accordingly, the communicator 130 may include a communication module (e.g., transceiver) supporting at least one of various wired and wireless communication methods. For example, the communication module may be in a form of a chipset or may be a sticker or a barcode (for example, a sticker including a near field communication (NFC) tag) including information required for communication.

Wireless communication may include, for example, at least one of wireless fidelity (Wi-Fi), Wi-Fi direct, Bluetooth, ultra-wideband (UWB), NFC, or the like. Wired communication may include, for example, at least one of universal serial bus (USB), high definition multimedia interface (HDMI), or the like.

In an example, the communicator 130 may perform peer-to-peer wireless communication with the wireless device 500 to transmit and receive signals or data. For example, the communicator 130 may communicate with the wireless device 500 through Bluetooth, Wi-Fi Direct, LTE direct, or the like.

The communicator 130 may transmit signals or data received from the wireless device 500 to the controller 120 or may transmit signals or data generated by the controller 120 to the wireless device 500. In an example, the communicator 130 may receive the probe request packet from the wireless device 500 and transmit the probe request packet to the controller 120, and may generate the probe response packet or the beacon packet including the state information of the image forming apparatus 100 under the control of the controller 120 and transmit the generated probe response packet or beacon packet to the wireless device 500.

Various types of data such as programs and files, such as applications, may be installed and stored in the memory 140. The controller 120 may access the data stored in the memory 140 and use the data or store new data in the memory 140. Further, the controller 120 may execute the programs installed in the memory 140. Also, the controller 120 may install an application received from outside through the communicator 130 in the memory 140.

In an example, the memory 140 may store a program for transmitting the state information of the image forming apparatus 100.

The image forming job performer 150 may perform an image forming job such as printing, copying, scanning, or faxing.

Although not shown in FIG. 4, the image forming apparatus 100 may further include a consumable monitor for monitoring a state of a consumable. In an example, the consumable monitor may monitor the state of the consumable and transmit state information of the consumable to the controller 120 when an event periodically occurs or a predetermined event occurs. In an example, when the event periodically occurs or the predetermined event occurs, the controller 120 may receive the state information of the consumables from the consumable monitor and update an IE, and include the updated IE in the probe response packet. The predetermined event may include the use of toner.

Figure 5:
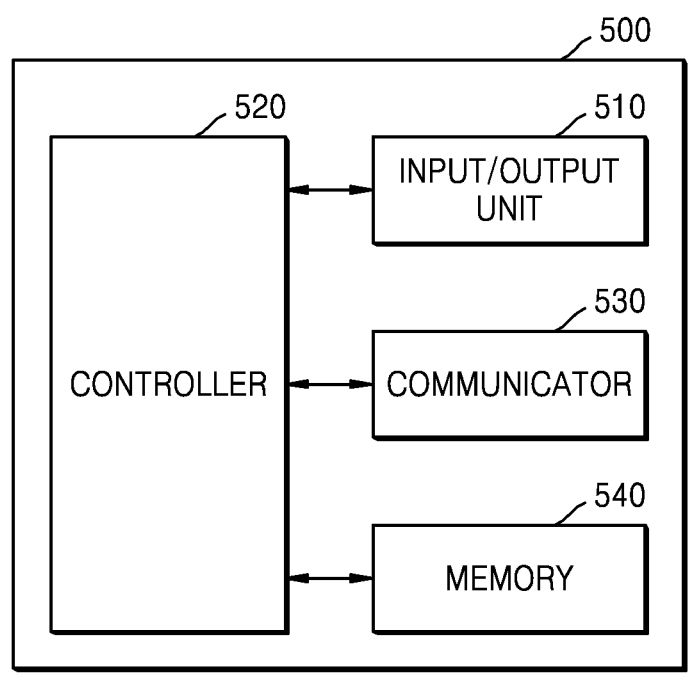
FIG. 5 is a diagram illustrating a configuration of a wireless device, according to an example.

FIG. 5 is a diagram illustrating a configuration of a wireless device, according to an example.

Referring to FIG. 5, the wireless device 500 may include an input/output unit 510, a controller 520, a communicator 530, and a memory 540. The wireless device 500 may include, for example, a smart phone, a tablet, a personal computer (PC), a consumer device, a medical device, a camera, a wearable device, or the like.

The input/output unit 510 may include an input unit used by the user 30 to input data for controlling the wireless device 500, and an output unit for displaying information processed by the wireless device 500.

For example, the input unit 510 may include a key pad, a dome switch, a touch pad (e.g., a contact capacitance type, a pressure resistive type, an infrared ray detection type, a surface ultrasonic wave conduction type, an integral tension measurement type, a piezo effect type, etc.), a jog wheel, a jog switch, or the like, but is not limited thereto. Further, the output unit may output an audio signal, a video signal, or a vibration signal, and may include a display, a speaker, a vibration motor, or the like. At this time, the display may be configured as a touch screen having a layer structure of the touch pad. However, the disclosure is not limited thereto, and the input/output unit 510 may include various input/output support devices.

In an example, the input/output unit 510 may display state information of the image forming apparatus 100 together with the detected image forming apparatus 100. In an example, the wireless device 500 may receive a probe response packet in response to a probe request packet or a beacon packet to determine the presence of the image forming apparatus 100. At this time, the probe response packet or the beacon packet may include the state information of the image forming apparatus 100 that transmitted the probe response packet or the beacon packet. Accordingly, the wireless device 500 may extract the state information of the image forming apparatus 100 from the probe response packet or the beacon packet and display the state information of the image forming apparatus 100 together with the detected image forming apparatus 100 through the input/output unit 510. This will be described with reference to FIGS. 6 and 7.

Figure 6:
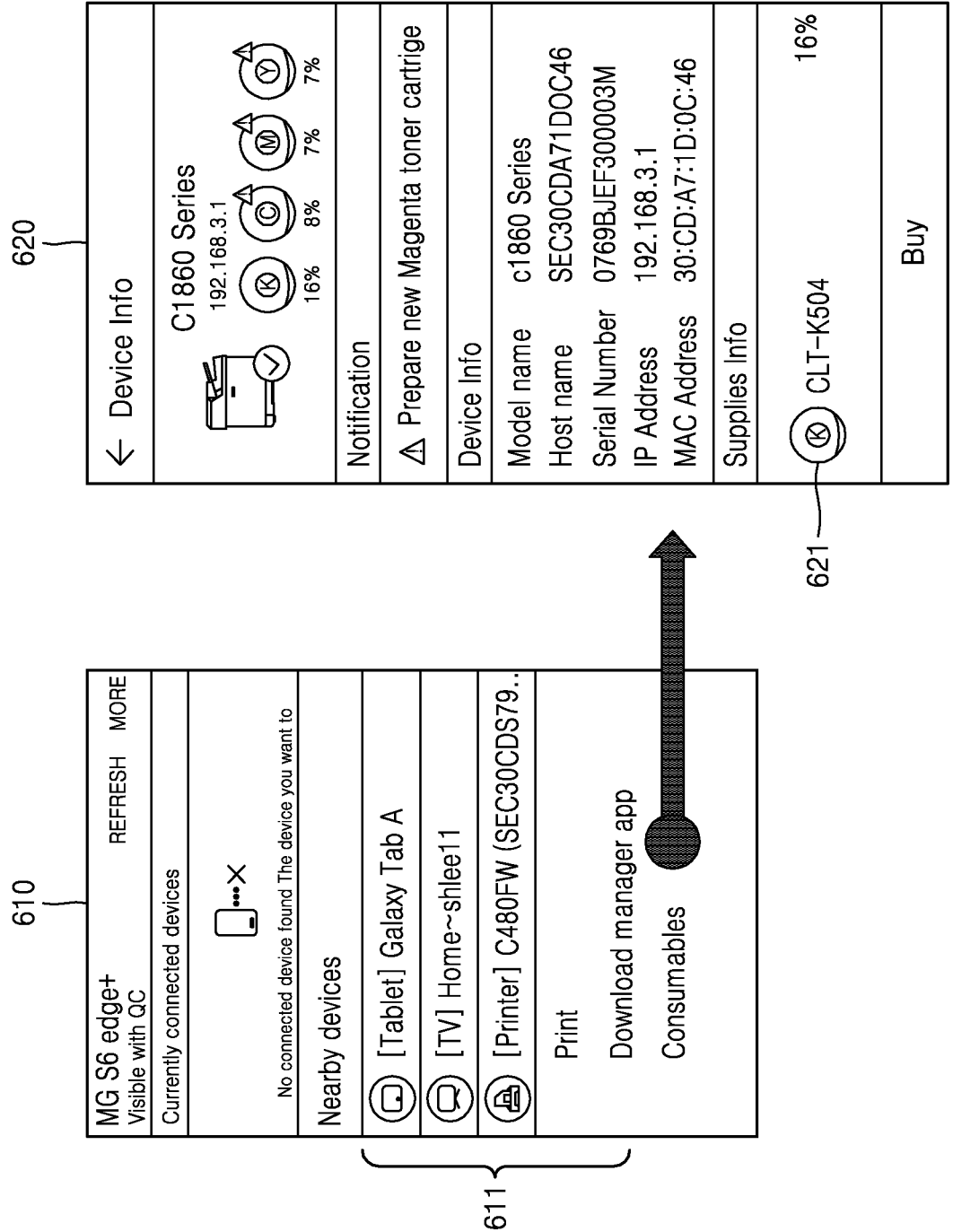
FIG. 6 is a diagram illustrating a screen displaying an image forming apparatus discovered on a wireless device together with state information of the image forming apparatus, according to an example.
Figure 7:
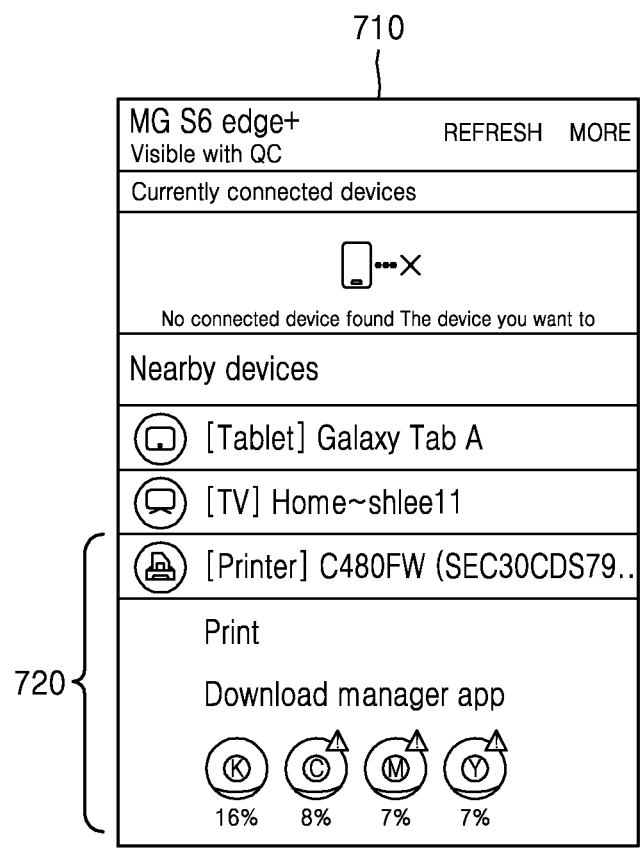
FIG. 7 is a diagram illustrating a screen displaying an image forming apparatus discovered on a wireless device together with state information of the image forming apparatus, according to another example.

FIG. 6 is a diagram illustrating a screen displaying an image forming apparatus discovered on a wireless device together with state information of the image forming apparatus, according to an example. FIG. 7 is a diagram illustrating a screen displaying an image forming apparatus discovered on a wireless device together with state information of the image forming apparatus, according to another example.

Referring to FIG. 6, devices 611 detected around the wireless device 500 may be displayed on a screen 610. When the image forming apparatus 100 is selected through a user input from among the devices 611 detected around the wireless device 500, information of the selected image forming apparatus 100 may be displayed on a screen 620. In an example, the displayed information may include the remaining amount of toner, that is, the state information of the image forming apparatus 100.

Referring to FIG. 7, devices detected around the wireless device 500 may be displayed on a screen 710. At this time, when there is the image forming apparatus 100 among the detected devices, the state information 720 of the image forming apparatus 100 together with the detected image forming apparatus 100 may be immediately displayed.

However, the screens 620 and 710 displaying the state information of the image forming apparatus 100 together with the image forming apparatus 100 detected around the wireless device 500 are only examples, and the state information of the image forming apparatus 100 may be displayed together with the detected image forming apparatus 100 by using various methods.

Referring back to FIG. 5, when the state information of the image forming apparatus 100 includes the purchase information of the consumable, the input/output unit 510 may display the purchase information of the consumable together with the detected image forming apparatus 100.

The controller 520 may control an operation of the wireless device 500, and may include a processor, such as a central processing unit (CPU). The controller 520 may control other components included in the wireless device 500 such that an operation corresponding to a user input received through the input/output unit 510 is performed.

For example, the controller 520 may execute a program stored in the memory 540, read a file stored in the memory 540, or store a new file in the memory 540.

In an example, the controller 520 may execute a program for displaying state information of the image forming apparatus 100, control the wireless device 500 to transmit a probe request packet for searching for the image forming apparatus 100, receive a probe response packet including the state information of the image forming apparatus 100 in response to the probe request packet from the detected image forming apparatus 100, acquire the state information of the detected image forming apparatus 100 from the probe response packet and display the acquired state information of the image forming apparatus 100 together with the detected image forming apparatus 100.

In an example, the probe response packet may include at least one IE. At this time, the state information of the image forming apparatus 100 may be included in a vendor specific information element assigned to a vendor among the at least one IE. The controller 520 may acquire the state information of the image forming apparatus 100 from the vendor specific information element of the probe response packet.

In an example, the state information of the image forming apparatus 100 included in the probe response packet may include state information of consumables. For example, the state information of the image forming apparatus 100 may include a remaining amount of toner, a remaining amount of paper, a remaining life of a transfer member, or the like.

Further, in an example, the state information of the image forming apparatus 100 may include purchase information used to purchase a consumable. For example, the purchase information may include a direct URL used to purchase the consumable, and may include an identification number of the consumable, such as a parts identification number of the consumable, or an identification number of the image forming apparatus 100.

In an example, when the purchase information is the URL, the controller 520 may display the URL used to purchase the consumable together with the state information of the image forming apparatus 100, i.e., the state information of the consumable. When the controller 520 receives a user input selecting the displayed URL through the input/output unit 510, the controller 520 may access the URL to display a website where the consumable may be purchased through the input/output unit 510.

In an example, when the purchase information is the identification number of the consumable or the identification number of the image forming apparatus 100, the controller 520 may search for the identification number to browse a website where the consumable may be purchased and display a URL of the website. When the controller 520 receives a user input selecting the displayed URL through the input/output unit 510, the controller 520 may access the URL to display the website where the consumable may be purchased through the input/output unit 510.

However, the controller 520 may not need to directly display the URL on the input/output unit 510 and may also display text or an image including a link to the URL.

According to an example, a user may conveniently purchase the consumable at the website.

The controller 520 may control the image forming job by executing the program stored in the memory 540 and transmitting a resultant signal or data to the image forming apparatus 100 through the communicator 530.

The communicator 530 may communicate with another device or a network in a wired or wireless manner. Accordingly, the communicator 530 may include a communication module supporting at least one of various wired and wireless communication methods. For example, the communication module may be in a form of a chipset or may be a sticker or a barcode (for example, a sticker including an NFC tag) including information required for communication.

Wireless communication may include, for example, at least one of Wi-Fi, Wi-Fi direct, Bluetooth, UWB, NFC, or the like. Wired communication may include, for example, at least one of USB, HDMI, or the like.

In an example, the communicator 530 may perform peer-to-peer wireless communication with the image forming apparatus 100 to transmit and receive signals or data. For example, the communicator 530 may communicate with the image forming apparatus 100 through Bluetooth, Wi-Fi Direct, LTE direct, or the like.

The communicator 530 may transmit signals or data received from the image forming apparatus 100 to the controller 520 or may transmit signals or data generated by the controller 520 to the image forming apparatus 100. In an example, the communicator 530 may generate and transmit the probe request packet under the control of the controller 520, receive the probe response packet or the beacon packet including the state information of the image forming apparatus 100 from the image forming apparatus 100 and transmit the generated probe response packet or beacon packet to the controller 520.

Various types of data such as programs and files, such as applications, may be installed and stored in the memory 540.

The controller 520 may access the data stored in the memory 540 and use the data or store new data in the memory 540. Further, the controller 520 may execute the programs installed in the memory 540. Also, the controller 520 may install an application received from outside through the communicator 530 in the memory 540.

In an example, the memory 540 may store a program for displaying the state information of the image forming apparatus 100.

According to an example, the wireless device 500 may receive the probe response packet or the beacon packet and display the state information of the image forming apparatus 100 to the user immediately before performing wireless communication, thereby enhancing user convenience.

A method of operating the image forming apparatus 100 and the wireless device 500 for transmitting state information of the image forming apparatus 100 will be described below. The redundant descriptions will be briefly provided.

Figure 8:
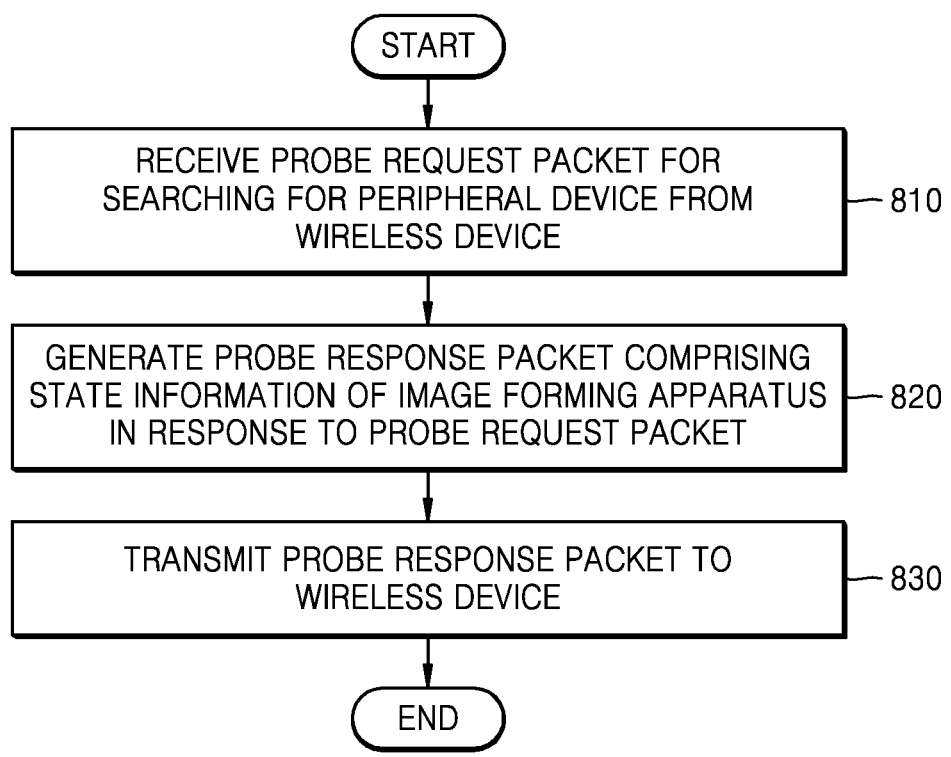
FIG. 8 is a flowchart illustrating a method of transmitting state information of an image forming apparatus, according to an example.

FIG. 8 is a flowchart illustrating a method of transmitting state information of an image forming apparatus, according to an example.

Referring to FIG. 8, the image forming apparatus 100 may receive a probe request packet for searching for a peripheral device from the wireless device 500 in operation 810.

In an example, the image forming apparatus 100 may acquire state information of consumables when an event periodically occurs or a predetermined event occurs.

In an example, upon receiving the probe request packet for searching for the peripheral device from the wireless device 500, the image forming apparatus 100 may receive the probe request packet for performing peer-to-peer wireless communication with the wireless device 500.

In operation 820, the image forming apparatus 100 may generate the probe response packet including the state information of the image forming apparatus 100 in response to the probe request packet. In an example, a probe response packet may include at least one IE, and the state information of the image forming apparatus 100 may be included in a vendor specific information element assigned to a vendor among the at least one IE. Also, the state information of the image forming apparatus 100 may include state information of consumables, and may include purchase information for purchasing consumables.

In operation 830, the image forming apparatus 100 may transmit the probe response packet to the wireless device 500.

Figure 9:
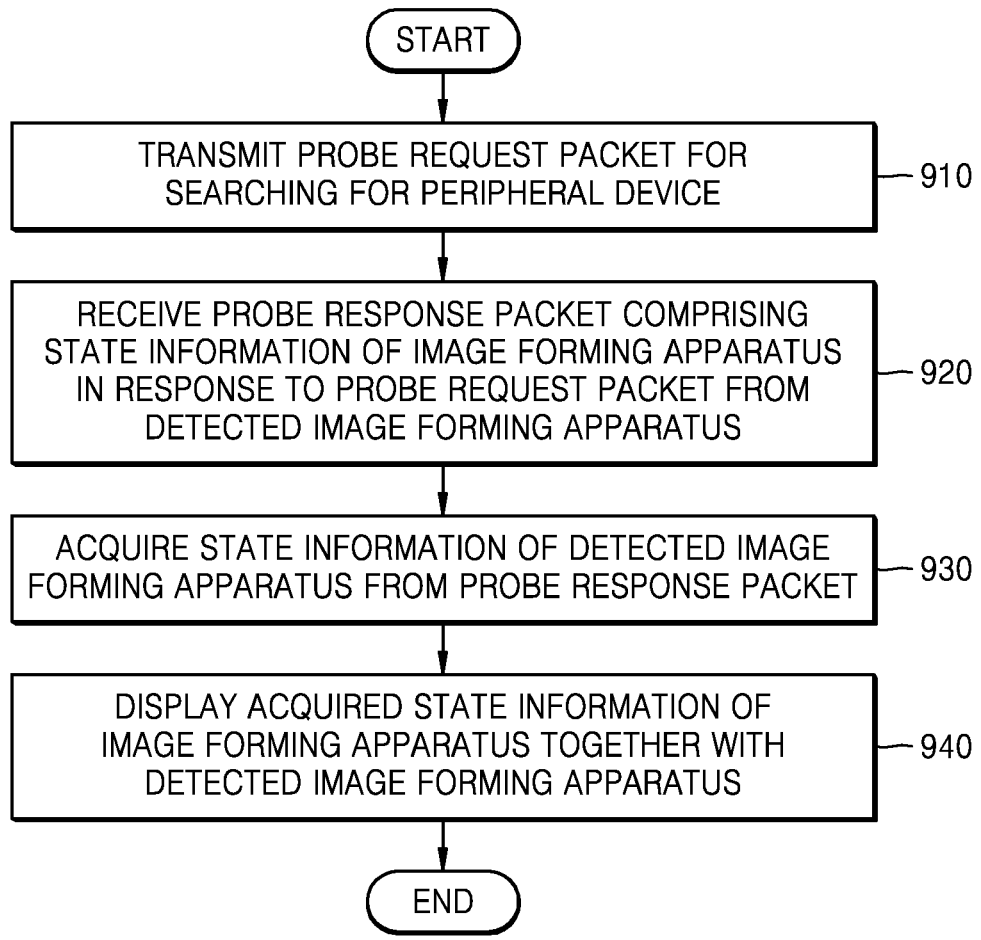
FIG. 9 is a flowchart illustrating a method by which a wireless device displays state information of an image forming apparatus, according to an example.

FIG. 9 is a flowchart illustrating a method by which a wireless device displays state information of an image forming apparatus, according to an example.

Referring to FIG. 9, the wireless device 500 may transmit a probe request packet for searching for a peripheral device in operation 910.

In operation 920, the wireless device 500 may receive a probe response packet including the state information of the image forming apparatus 100 in response to the probe request packet from the detected image forming apparatus 100.

In operation 930, the wireless device 500 may acquire the state information of the detected image forming apparatus 100 from the probe response packet.

In operation 940, the wireless device 500 may display the acquired state information of the image forming apparatus 100 together with the detected image forming apparatus 100.

Figure 10:
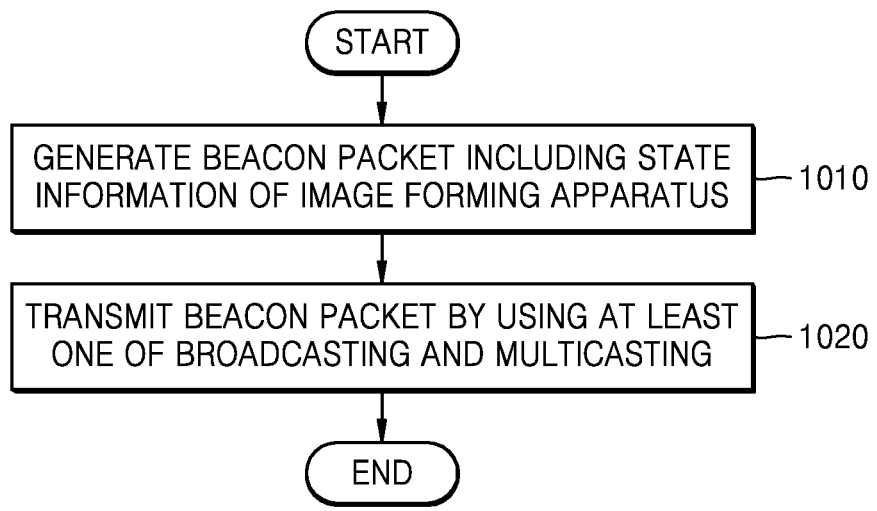
FIG. 10 is a flowchart illustrating a method of transmitting state information of an image forming apparatus, according to another example.

FIG. 10 is a flowchart illustrating a method of transmitting state information of an image forming apparatus, according to another example.

Referring to FIG. 10, the image forming apparatus 100 may generate a beacon packet including the state information of the image forming apparatus 100 in operation 1010.

In operation 1020, the image forming apparatus 100 may transmit the beacon packet by using at least one of broadcasting and multicasting.

Figure 11:
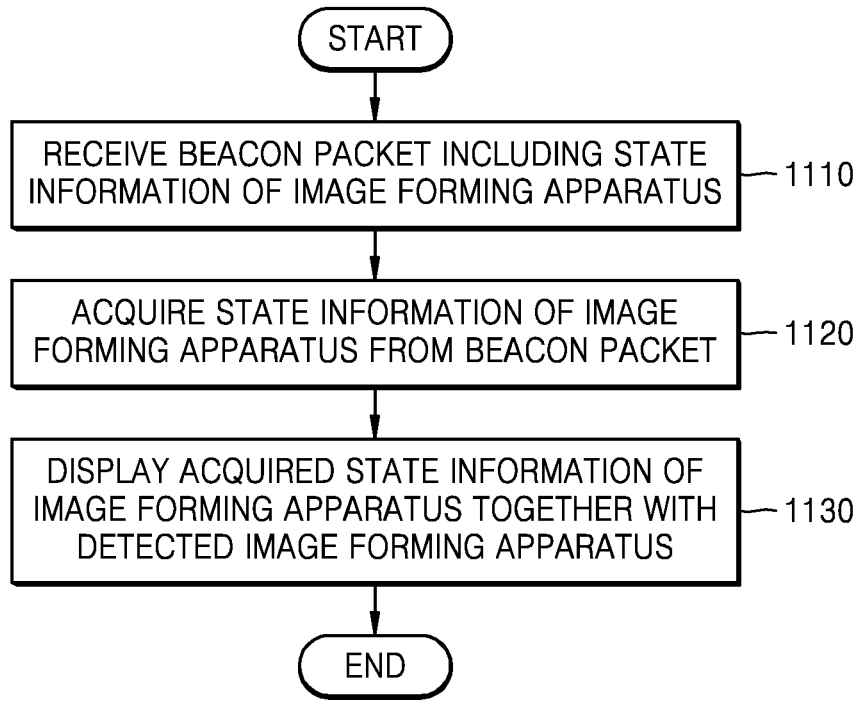
FIG. 11 is a flowchart illustrating a method by which a wireless device displays state information of an image forming apparatus, according to another example.

FIG. 11 is a flowchart illustrating a method by which a wireless device displays state information of an image forming apparatus, according to another example.

Referring to FIG. 11, the wireless device 500 may receive a beacon packet including the state information of the image forming apparatus 100 in operation 1110.

In operation 1120, the wireless device 500 may acquire the state information of the image forming apparatus 100 from the beacon packet.

In operation 1130, the wireless device 500 may display the acquired state information of the image forming apparatus 100 together with the detected image forming apparatus 100.

The above-described examples may also be embodied as a non-transitory computer-readable recording medium having recorded thereon computer-executable instructions and data. At least one of the instructions and data may be stored in the form of program code, and may configure a program module to perform an appropriate operation when executed by a processor.

Examples of the non-transitory computer-readable recording medium include magnetic storage media (e.g., hard disks) and optical recording media (e.g., CDs or DVDs), or memories included in a server accessible through a network. For example, the non-transitory computer-readable recording medium may include at least one of the memory 140 of the image forming apparatus 100 and a memory of the input/output unit 110, or include a memory included in an external device connected to the image forming apparatus 100 over a network.

While one or more examples have been described with reference to the figures, it will be understood by those of ordinary skill in the art that various changes in form and details may be made therein without departing from the spirit and scope of the disclosure as defined by the following claims. It should be understood that examples described herein should be considered in a descriptive sense only and not for purposes of limitation.

What is claimed is:

1. An image forming apparatus comprising:
a transceiver to communicate with a wireless device;
a memory storing a program for transmitting state information of the image forming apparatus;
a controller to, by executing the program for transmitting the state information of the image forming apparatus:
control the image forming apparatus to receive, from the wireless device, a probe request packet for searching for a peripheral device,
generate a probe response packet comprising the state information of the image forming apparatus in response to the probe request packet, and
transmit the probe response packet to the wireless device; and
an image forming job performer to perform an image forming job under control of the controller,
wherein the state information of the image forming apparatus comprises state information of a consumable, purchase information used to purchase the consumable, and vendor-specific information of the image forming apparatus.

2. The image forming apparatus of claim 1,
wherein the probe response packet comprises at least one information element, and
wherein the state information of the image forming apparatus is included in a vendor-specific information element assigned to a vendor among the at least one information element.

3. The image forming apparatus of claim 1, further comprising a consumable monitor to monitor a state of the consumable,
wherein, when an event periodically occurs or a predetermined event occurs, the controller acquires the state information of the consumable from the consumable monitor.

4. The image forming apparatus of claim 1,
wherein the controller:
controls the image forming apparatus to acquire the state information of the image forming apparatus,
generates a beacon packet comprising the state information of the image forming apparatus, and
transmits the beacon packet by using at least one of broadcasting and multicasting, and
wherein the beacon packet comprises a packet for notifying a peripheral wireless device of the presence of the image forming apparatus.

5. The image forming apparatus of claim 1, wherein the transceiver performs peer-to-peer wireless communication with the wireless device.

6. The image forming apparatus of claim 1, wherein the purchase information comprises a uniform resource link used to purchase the consumable.

7. The image forming apparatus of claim 1, wherein the purchase information comprises a parts identification number of the consumable.

8. The image forming apparatus of claim 1, wherein the vendor-specific information of the image forming apparatus includes an organizationally unique identifier value indicating the vendor.

9. A method of transmitting state information of an image forming apparatus, the method comprising:
receiving, from a wireless device, a probe request packet for searching for a peripheral device;
generating a probe response packet comprising the state information of the image forming apparatus, in response to the probe request packet; and
transmitting the probe response packet to the wireless device,
wherein the state information of the image forming apparatus comprises state information of a consumable, purchase information used to purchase the consumable, and vendor-specific information of the image forming apparatus.

10. The method of claim 9,
wherein the probe response packet comprises at least one information element, and
wherein the state information of the image forming apparatus is included in a vendor-specific information element assigned to a vendor among the at least one information element.

11. The method of claim 9, further comprising, when an event periodically occurs or a predetermined event occurs, acquiring the state information of the consumable.

12. The method of claim 9, further comprising:
generating a beacon packet comprising the state information of the image forming apparatus; and
transmitting the beacon packet by using at least one of broadcasting and multicasting, wherein the beacon packet comprises a packet for notifying a peripheral wireless device of the presence of the image forming apparatus.

13. The method of claim 9, wherein the receiving, from the wireless device, of the probe request packet for searching for the peripheral device comprises receiving the probe request packet for performing peer-to-peer wireless communication with the wireless device.

14. The method of claim 9, wherein the purchase information comprises a uniform resource link used to purchase the consumable.

15. The method of claim 9, wherein the purchase information comprises a parts identification number of the consumable.

16. The method of claim 9, wherein the vendor-specific information of the image forming apparatus includes an organizationally unique identifier value indicating the vendor.

17. A wireless device comprising:
- a transceiver to communicate with an image forming apparatus;
- a memory storing a program for displaying state information of the image forming apparatus;
- a controller to, by executing the program for displaying the state information of the image forming apparatus:
  - control the wireless device to transmit a probe request packet for searching for a peripheral device,
  - receive, from a detected image forming apparatus, a probe response packet comprising the state information of the image forming apparatus, in response to the probe request packet,
  - acquire, from the probe response packet, state information of the detected image forming apparatus, and
  - display the acquired state information of the image forming apparatus together with the detected image forming apparatus,
- wherein the state information of the image forming apparatus comprises state information of a consumable, purchase information used to purchase the consumable, and vendor-specific information of the image forming apparatus.

18. A method, performed by a wireless device, of displaying state information of an image forming apparatus, the method comprising:
- transmitting a probe request packet for searching for a peripheral device;
- receiving, from a detected image forming apparatus, a probe response packet comprising the state information of the image forming apparatus, in response to the probe request packet;
- acquiring, from the probe response packet, state information of the detected image forming apparatus; and
- displaying the acquired state information of the image forming apparatus together with the detected the image forming apparatus,
- wherein the state information of the image forming apparatus comprises state information of a consumable, purchase information used to purchase the consumable, and vendor-specific information of the image forming apparatus.

* * * * *